United States Patent [19]

Bloor et al.

[11] Patent Number: 4,597,597

[45] Date of Patent: Jul. 1, 1986

[54] CONNECTION ASSEMBLIES

[76] Inventors: Trevor J. Bloor; Lawrence J. Walton, both of P.O. Box 388, Broadbeach, Queensland, 4217, Australia

[21] Appl. No.: 475,317

[22] Filed: Mar. 14, 1983

[30] Foreign Application Priority Data

Mar. 19, 1982 [AU] Australia .............................. PF3219

[51] Int. Cl.⁴ .............................................. F16L 5/02
[52] U.S. Cl. .................................... 285/196; 285/921
[58] Field of Search ....... 285/162, 158, 159, DIG. 22, 285/242, 189, 192, 194, 196, 338; 16/2; 248/56

[56] References Cited

U.S. PATENT DOCUMENTS

| | | | |
|---|---|---|---|
| 1,986,447 | 1/1935 | Rishel | 285/158 |
| 2,800,526 | 7/1957 | Moorhead | 16/2 X |
| 2,864,161 | 12/1958 | Curtiss | 248/56 X |
| 2,876,485 | 3/1959 | Cowles | 16/2 X |
| 3,076,668 | 2/1963 | Famely | 248/56 X |
| 3,481,310 | 12/1969 | Alburger | 285/192 X |
| 3,565,466 | 2/1971 | Mullings | 285/158 |
| 4,207,921 | 6/1980 | Sloan | 285/162 X |
| 4,269,172 | 5/1981 | Parker | 126/450 |

Primary Examiner—Richard J. Scanlan, Jr.
Assistant Examiner—E. S. Katz
Attorney, Agent, or Firm—Murray Schaffer

[57] ABSTRACT

A connection assembly for connecting flexible tubes such as flexible tubes of a solar heat exchanger to a header pipe. The connection assembly includes a tubular spigot member which co-acts at one end with a sleeve to compress the tube and maintain the tube in sealing engagement with the spigot member. The opposite end of the spigot member is engaged with the header pipe by means of a hollow flexible plug which is located in an aperture in the header pipe and which expands radially outwardly on engagement with the spigot member to prevent withdrawal of the spigot member and ensure efficient sealing therearound.

6 Claims, 9 Drawing Figures

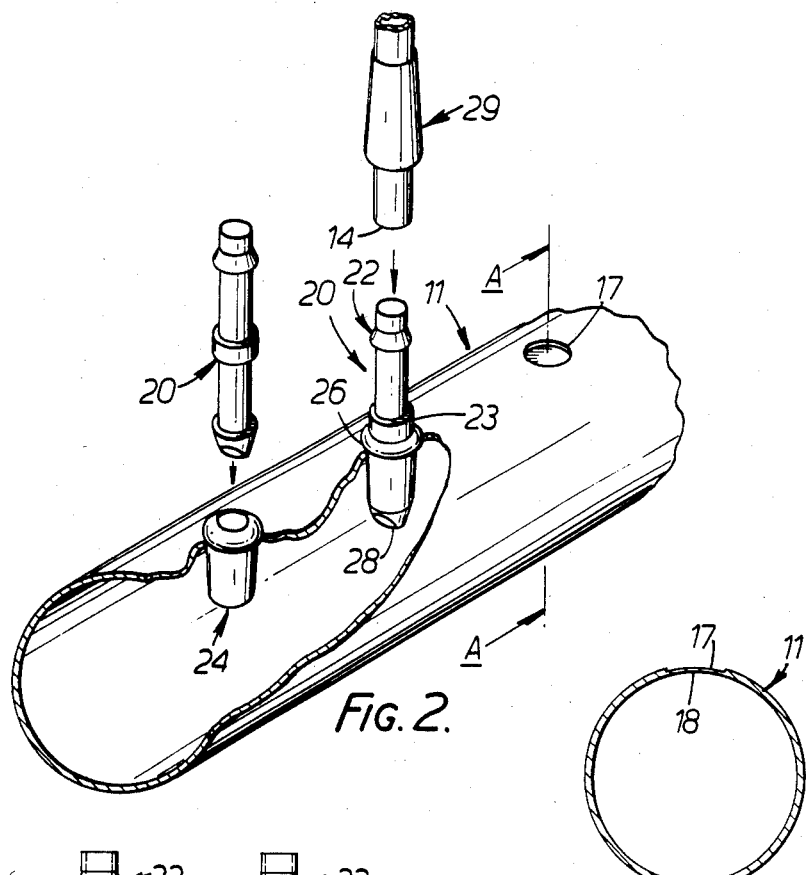
FIG. 2.
FIG. 2A.
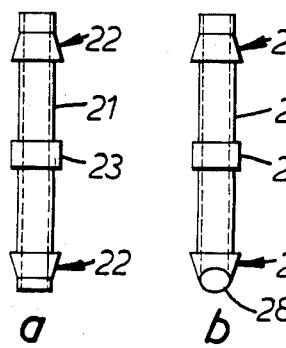
FIG. 3.
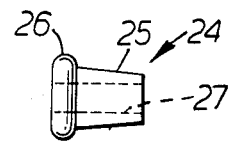
FIG. 4.
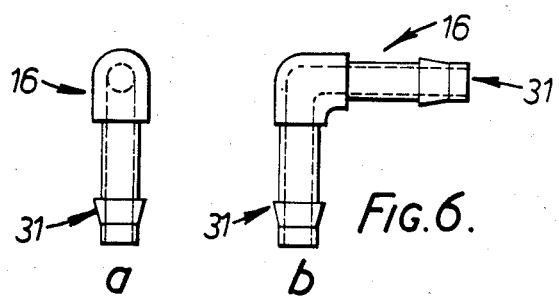
FIG. 6.
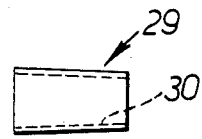
FIG. 5.

CONNECTION ASSEMBLIES

BACKGROUND OF THE INVENTION

This invention relates to improved connection assemblies and in particular but not exclusively to an improved method and means for interconnecting flexible tubes or connecting flexible tubes, such as flexible tubes of a solar heat exchanger, to a header pipe.

At present there are many solar water heating arrangements available which operate to provide hot water for domestic purposes or at a lower temperature for say swimming pool heating or space heating. One such proposal for swimming pool heating, for example that which is described in U.S. Pat. No. 4,269,172, provides a multi-tube plastics absorber which is mounted on the roof of a building so that water flowing through the tubes receives heat directly from the sun and by conduction from the roof's surface. In the above arrangement the absorber tubes communicate at one end with respective inlet and outlet headers via plug-in adapters, whilst the respective tubes of the absorber at the opposite end are interconnected by push-in transfer means so that water flowing in the inlet header passes through the absorber and back to the outlet header.

In each instance plastic solvent glue or the like is normally used to seal the respective connections to prevent leakage. It has been found, however, that the solvent glue tends to lose its effectiveness over a period of time and thus the seal is often broken. If glue is not used, the wall of the tube must be made relatively thick so that the tube itself acts as a clamp on the plug-in adapter or transfer means.

In other arrangements, a multitube absorber is looped back on itself and the opposite ends of the tubes are plugged into the header pipes by means of cylindrical plugs which are inserted into the ends of the tubes and which are then forced into the apertures in the header pipes to provide the sealing effect. In this instance, the wall of the tube acts as the sealing medium and again must be relatively thick to ensure reliability in use. However, use of relatively thick walled tube for the connection assemblies is wasteful and expensive and not required for the heat receiving section of the absorber. A further disadvantage of the loop arrangement is that thicker material is also required at the looped ends to prevent the channels from crimping and closing off. Use of a thick walled tube in these instances causes the appearance of the absorber in situ to be unacceptable as the loop tends to stand up rather than lay flat on the roof. Furthermore, at the loop ends the heat contact between the roof and the absorber is broken resulting in loss of conducted heat energy from the roof.

A further disadvantage of the known swimming pool heat exchanger assemblies is that the inlet and outlet headers are either provided with a plurality of pre-formed apertures therealong or the pipes require manual drilling to enable the plug-in connections to be made. If the apertures are pre-formed, those apertures not in use must be plugged up in some manner which can cause leakage problems over a period of time, whilst if non-apertured pipes are used, a relatively high skill is required to ensure accurate drilling of the apertures on site.

SUMMARY OF THE INVENTION

The present invention aims to overcome or alleviate at least some of the above disadvantages by providing an improved assembly and method for connecting flexible tubes to spigots and spigots to header pipes such as header pipes of water heating systems. The present invention also provides an improved arrangement for interconnecting flexible tubes and improved inlet and outlet headers for use in water heating systems. Other objects and advantages of the invention will become apparent from the following description.

With the above and other objects in view, the invention resides broadly in a method of interconnecting a tube of flexible material and a spigot member of the type having an annular enlarged portion thereon, said method including the steps of:
 (i) placing a sleeve member over one end of said tube;
 (ii) forcing said tube end onto said spigot member and over said annular enlarged portion; and
 (iii) moving said sleeve member along said tube and over said spigot member so that said sleeve member co-acts with said enlarged portion to compress said tube therebetween whereby to form said interconnection.

In a further aspect, the invention resides broadly in a method of connecting a spigot member to a header pipe having a circular aperture in its wall, said spigot member having first and second annular enlarged portions spaced therealong, said method including the steps of providing a resilient plug, said plug having an enlarged head, a reduced diameter shank portion, and a longitudinal bore extending therethrough, forcing said plug into said aperture so that said shank portion engages therewith, forcing said spigot member through said plug bore so that said first annular enlarged portion engages with and compresses said plug head and said second annular enlarged portion is moved beyond the end of said plug, and releasing said spigot member whereby expansion of said plug head against said first annular enlarged portion causes outward movement of said spigot member and engagement of said second annular enlarged portion with said plug end causes longitudinal compression of and consequent radial expansion of said plug shank portion.

The invention also resides in the connections formed in accordance with the above methods and a heat exchanger assembled in accordance with the above methods.

BRIEF DESCRIPTION OF THE DRAWINGS

In order that the invention may be more readily understood and put into practical effect, reference will now be made to the accompanying drawings which illustrate a preferred embodiment of the invention and wherein:

FIG. 2 is a cutaway perspective view of a header pipe showing the steps in forming the connections between the heat exchanger tubes, spigot members, and header pipe;

FIG. 2A is a sectional view along line A—A of FIG. 2;

FIGS. 3a and 3b are respective elevational views of a typical spigot member used in the connection assembly;

FIG. 4 is an elevational view of a plug for use in connecting the spigot members to the headers;

FIG. 5 is an elevational view of a tapered sleeve for connecting the heat exchanger tubes to the spigot members; and FIGS. 6a and 6b are respective end and elevational views of an elbow for interconnecting respective tubes of the heat exchanger.

DESCRIPTION OF THE INVENTION

Figure 1:
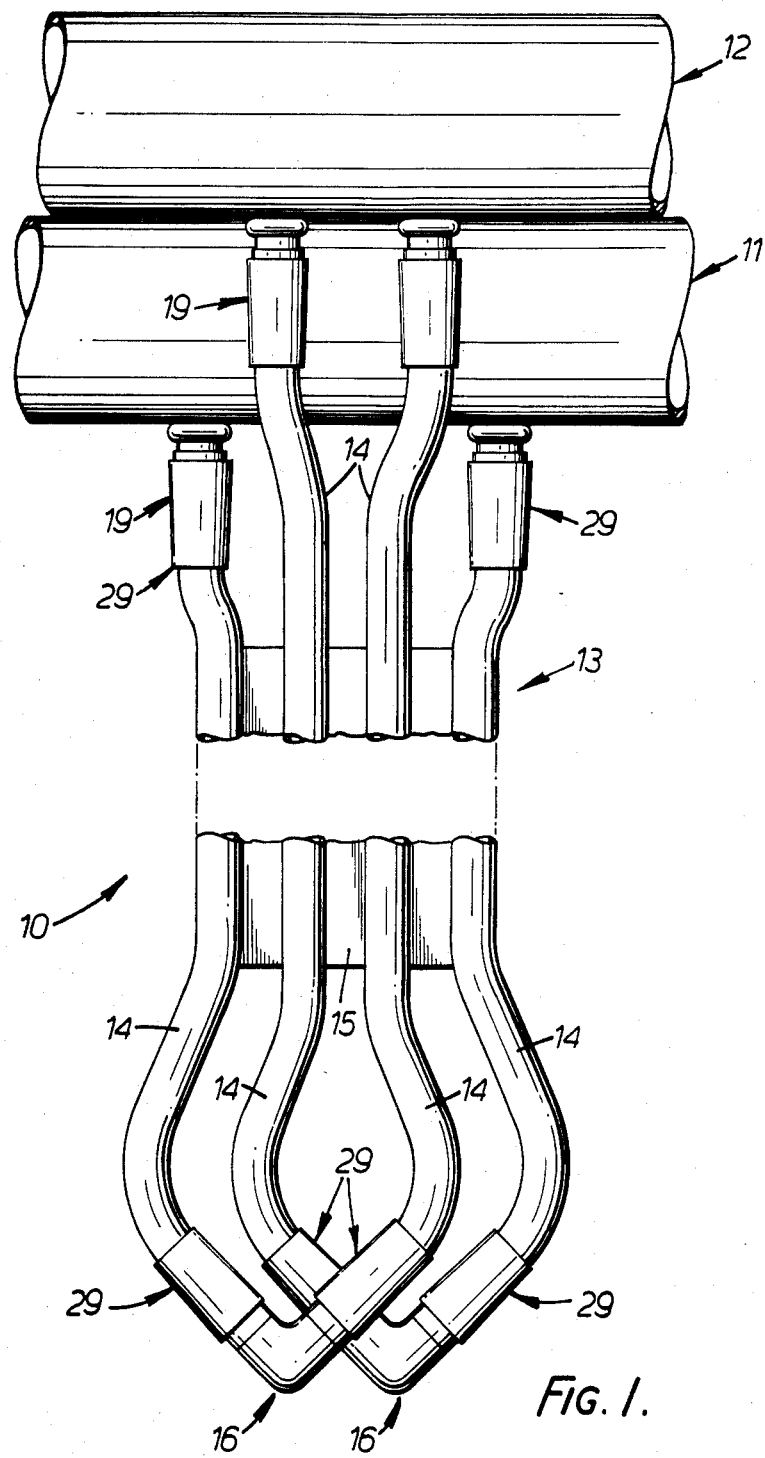
FIG. 1 is a plan view of a section of heat exchanger assembly using the connection method and means of the present invention.

Referring to FIG. 1, there is illustrated a heat exchanger 10 incorporating the connection assemblies according to the present invention. As shown, the heat exchanger 10 includes an inlet header 11 and an outlet header 12 interconnected by an absorber mat 13, including in this instance four tubular members 14 interconnected by webs 15, preferably constructed of E.P.D.M. (ethylene propylene diene monomer or terpolymer). As shown, two of said tubular members 14 are connected to the inlet header 11 and two of the tubular members 14 are connected to the outlet header 12 whilst transfer means 16 are provided at the opposite ends of the absorber mat 13 and connected to the respective tubular members 14 to transfer water from the inlet header 11 to the outlet header 12 via the absorber mat 13.

Preferably the headers 11 and 12 are formed of plastics material resistant to ultra-violet light and as shown in FIG. 2 a plurality of spaced circular recesses 17 are formed along each header. Each recess 17 is preferably formed by part drilling into the outer wall of the header so that a recess is formed in the header wall but does not extend into the interior of the header (see FIG. 2A). Alternatively, the recesses 17 may be moulded in situ during the header manufacturing process. This arrangement ensures that apertures for communication with the absorber ducts 14 may be formed in the header 11 by simply removing, say by punching out, the reduced thickness portion 18 of the header wall to form a circular aperture extending into the interior of the header 11. This enables the installer to select the positions where the heat exchanger tubes 14 are to be communicated with the header and also eliminates any on-site drilling of holes or plugging up of prior formed apertures in the header.

The tubular members 14 are connected to the respective inlet or outlet header 11 and 12 by means of the connection assemblies 19 in accordance with the steps illustrated in FIG. 2. Each connection assembly 19 includes a spigot member 20 which is adapted to engage at its respective opposite end with a tubular member 14 and a header 11 or 12. As shown more clearly in FIGS. 3a and 3b, each spigot member 20 is of generally tubular form and includes a tubular shank 21 having respective annular barbs 22 adjacent its opposite ends, and an enlarged diameter annular shoulder portion 23 intermediate its ends. Each spigot member 20 is adapted to be mounted to the respective header by means of a hollow manifold plug 24 which is formed of resilient material such as E.P.D.M. As shown more clearly in FIG. 4, each manifold plug 24 has an outer frusto conical wall 25 which tapers away from an enlarged rounded head 26, and includes a bore 27 extending longitudinally therethrough. The wall of the plug 24 adjacent the enlarged head portion 26 is of larger diameter than the diameter of the apertures formed in the header 12 so that the plug 24 may be forced thereinto and located in position in the manner shown in FIG. 2. The longitudinal bore 27 in the plug 24 preferably has an outer diameter less than the outer diameter of the shank portion 21 of the spigot member 20 so as to be sealably engaged therewith. Furthermore, the length of the plug 24 is slightly greater than the minimum distance between the barb 22 and shoulder portion 23 of the spigot member 20. To mount the spigot member 20 to the header, the plug 24 is initially inserted into the header aperture formed by removal of the reduced thickness portion 18. The spigot member 20 is then forced into the bore 27 in the plug 24 and through into the interior of the header until the barb 22 at the leading end of the spigot member 20 passes beyond the end of the plug. At the same time the enlarged rounded head 26 of the plug 24 is resiliently compressed between the shoulder portion 23 of the spigot member 20 and the header wall. The spigot member 20 is then released and resilient expansion of the rounded head 26 against the shoulder 23 will cause the spigot member 20 to move slightly outwardly of the header 11. This will cause the wall of the plug 24 by virtue of the engagement between the barb 22 of the spigot member 20 and the end of the plug to be slightly compressed longitudinally and expand radially outwardly thus preventing withdrawal of the plug and pull out of the spigot member 20. Furthermore, such expansion will increase the sealing effect between the plug 24 and the header aperture.

Preferably the inserted end of the spigot member is cut away at 28 so as to present an inlet or outlet opening to the direction of flow so as to ensure greater efficiency in flow transfer between the header and the hollow flow passage of the spigot member and connected tube. Of course, the spigot member may also be engaged in the header apertures by firstly engaging the plug thereover and forcing the assembly into the aperture.

Each tubular member 14 of the heat absorber 13 is connected to the protruding portion of the spigot member 20 with the aid of sleeves 29 (see FIG. 5). The sleeves 29 are preferably formed of nylon or the like and in this instance are provided with a frusto conical inner surface 30. The respective sleeves 29 are initially arranged over the free ends of the tubular members 14 so that the larger inner diameter portion is adjacent the respective free end as shown in FIG. 2. To sealably engage each tubular member 14 with a respective spigot member 20, the free end thereof is passed over the barb 22 of the spigot member 20 and slid over the tubular shank portion 21 into abutment with the shoulder portion 23 of the spigot member 20. The sleeve 29 is then slid along the tubular member 14 so that the co-operative wedging action between the frusto conical inner wall of the sleeve 29 and the barb 22 will compress the flexible wall of the tubular member 14 and ensure a tight seal and connection between the tubular member 14 and the spigot member 20. To increase this wedging action, the tubular member 14 may be stretched longitudinally after it is engaged over the spigot member 20 so as to reduce the outer diameter and wall thickness thereof whilst the sleeve 29 is slid over the spigot member. In an alternative arrangement, the sleeve 29 may have a cylindrical bore of lesser internal diameter than the outer diameter of the tubular member. When sleeves of this type are used, the connection is formed by stretching the tubular member 14 after it is placed over the spigot member 20 to reduce the outer diameter thereof to permit the sleeve to be slid over the barb 22 of the spigot member 20.

As shown in FIG. 1, the opposite remote ends of the respective tubular members 14 are interconnected by transfer means 16 which in this embodiment are in the form of elbows of the type shown in FIGS. 6a and 6b.

Each elbow includes a pair of end portions 31 similar in form to the opposite end portions of the spigot members 20 and each elbow is connected to the respective opposite ends of the ducts 14 by means of sleeves 29 in a similar manner to that described above.

It will be apparent from the above that the present invention provides a simple, reliable and efficient manner for connecting spigot members to header pipes and tubular members to the spigot members. Of course, it will be realised that the connection method described above may be applied for any suitable purpose not limited to heat exchanger or solar water heating applications. Similarly, the tube interconnection arrangement is not limited to the particular application described above. A further advantage of the connection arrangements of the present invention is that they allow for high pressure working without leakage as well as low pressure working normally found with swimming pool heating systems.

We claim:

1. In combination with a fluid flow pipe having an aperture in its wall, a plug formed of resilient material, said plug having a shank portion extending through said aperture and engaged with the walls thereof, an enlarged annular head portion engaged with the outer surface of said pipe adjacent said aperture and a free end disposed within said flow pipe, said shank portion having an exterior surface normally tapering from said head portion to the opposite or free end of said plug, said plug further including a bore extending longitudinally therethrough, a spigot having a body extending through said bore to be sealingly engaged therewith, said body having a pair of annular enlarged portions, said enlarged portions being spaced apart a distance less than the length of said plug such that said plug head portion is required to be compressed by one of said enlarged portions to enable the other of said enlarged portions to move beyond said free end of said shank portion and wherein subsequent resilient expansion of said compressed head portion causes said spigot to move slightly outwardly of said pipe and said other enlarged portion to engage said free end of said shank portion to thereby longitudinally compress said shank portion causing radial expansion thereof on the side of said aperture opposite said head portion to resist detachment of said spigot and said plug from said pipe.

2. The combination according to claim 1, wherein the body of said spigot is generally tubular, the diameter thereof being greater than the internal diameter of said plug bore so that said body is sealingly engaged therewith.

3. The combination according to claim 1, wherein the enlarged portions of said spigot define radially extending opposed shoulders.

4. The combination according to claim 1, wherein the operative leading end of said spigot is tapered from said other enlarged portion.

5. The combination according to claim 4, wherein said operative leading end of said spigot comprises a frusto conical barb.

6. The combination according to claim 5, wherein the end of said spigot adjacent said barb is cut away at an acute angle to the longitudinal axis of said spigot to define an inlet or outlet opening to said spigot.

* * * * *